(12) United States Patent
Vonk et al.

(10) Patent No.: US 6,688,039 B2
(45) Date of Patent: Feb. 10, 2004

(54) METHOD OF PRESERVING CUT FLOWERS, GEL ON WATER BASIS AND A HOLDER

(76) Inventors: Hans Vonk, Lange Schilk 5, NL-2461 LC TER AAR (NL); Thomas Willem Hendericus Star, Het Cappelrijeland 9, NL-2231 ZD Rijnsburg (NL)

( * ) Notice: Subject to any disclaimer, the term of this patent is extended or adjusted under 35 U.S.C. 154(b) by 0 days.

(21) Appl. No.: 10/375,390

(22) Filed: Feb. 27, 2003

(65) Prior Publication Data

US 2003/0131528 A1 Jul. 17, 2003

Related U.S. Application Data

(63) Continuation of application No. 09/674,015, filed as application No. PCT/NL99/00239 on Apr. 26, 1999, now abandoned.

(30) Foreign Application Priority Data

Apr. 24, 1998 (NL) .............................................. 1008986

(51) Int. Cl.[7] .................................................. A01G 5/00
(52) U.S. Cl. ..................................................... 47/41.01
(58) Field of Search ........................ 47/41.12; 424/618; 525/296

(56) References Cited

U.S. PATENT DOCUMENTS

| 4,061,490 A | * | 12/1977 | Yukinaga et al. | ............ 424/618 |
| 4,559,074 A | * | 12/1985 | Clarke | ........................ 525/296 |
| 5,564,225 A | * | 10/1996 | Quiding et al. | .......... 47/58.1 R |

FOREIGN PATENT DOCUMENTS

| BE | 1008661 A | * | 7/1996 | ............ A47G/5/06 |
| JP | 36316260 A | * | 7/1988 | ................ 47/41.12 |
| JP | 63162601 A | * | 7/1988 | ............ A01N/3/02 |
| JP | 405155702 A | * | 6/1993 | ................ 47/41.12 |
| JP | 408172911 A | * | 7/1996 | ................ 47/41.12 |
| JP | 2247101 | * | 12/1996 | ............ A01G/3/02 |

OTHER PUBLICATIONS

The Artistic Shop,LLC; Water Polymer Crystals; http://www.theartisticshop.com/water%20polymer%crystals.htm.*
PlantGel.com; The Amazing Soil Alternative; Sep. 19, 2002 download by Examiner; Background and Frequently Asked Questions.*
Goodfellow.com; Material Information, Polyacrylamide/acrylate Hydrogel; Sep. 19, 2002 download by Examiner.*
PantGel.com; Material Safety Data Sheet; Sep. 19, 2002 download by Examiner; Tradename and composition of Plant Gel.*

* cited by examiner

*Primary Examiner*—Charles T. Jordan
*Assistant Examiner*—Francis T. Palo
(74) *Attorney, Agent, or Firm*—Akerman Senterfitt

(57) ABSTRACT

A method of preserving cut flowers, in which the cut flowers are placed with their stems into a holder containing a polyacrylamide aqueous gel, in which the size of the dry granules is 0.2 mm or less. In addition, a polyacrylamide aqueous gel, in which the size of the dry granules is 0.2 mm or less, and a holder suitable for the preservation of cut flowers in such a gel.

8 Claims, 1 Drawing Sheet

METHOD OF PRESERVING CUT FLOWERS, GEL ON WATER BASIS AND A HOLDER

Figure 1:
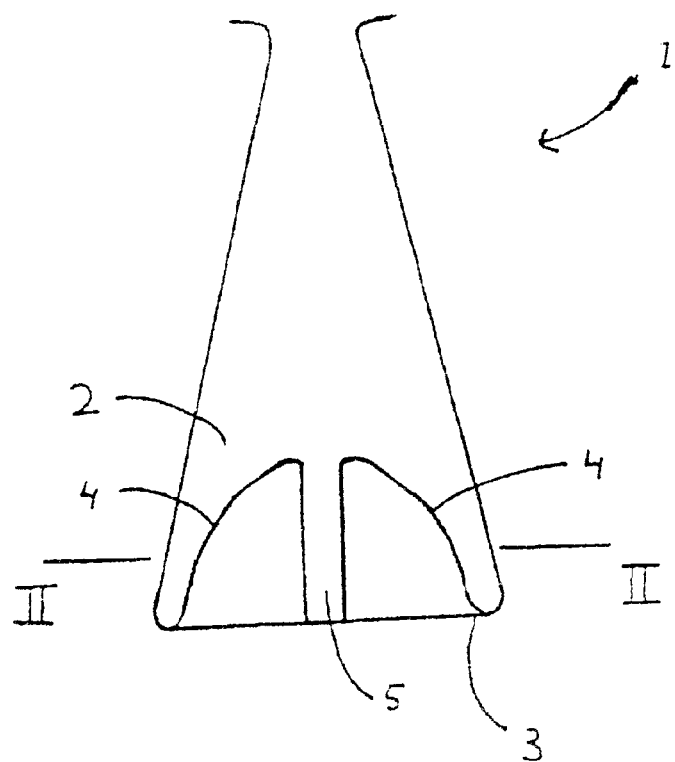

This application is a continuation of application Ser. No. 09/674,015 filed Dec. 8, 2000. Abandoned wich national stage PCT/NL99/00239 filed Apr. 26, 1999.

The present invention relates to a method of preserving cut flowers, wherein the cut flowers are placed with their stems into a holder, which holder is provided with a bottom and contains an aqueous gel as medium, and the gel is prepared by allowing granules of a water absorbent cross-linked polymer to swell.

It is known that to preserve cut flowers they generally have to stand substantially continuously in water. This also applies during transport, especially for the most delicate cut flowers such as lathyrus. During the transport of holders filled with water the water may splash out, or the holders may fall over so that the cut flowers stand dry. At the same time, bacteria and moulds and consequently diseases as, for example, botrytis may spread through the water. A further disadvantage is that the cut flowers have to be transported vertically, which means that more space is required. This in turn raises the transport costs. It makes transport of cut flowers over large distances very expensive.

To solve this problem the prior art proposes the use of a gel (see, for example, SE-8403211). The known gels exhibit various disadvantages. Some gels themselves serve as medium for bacteria, thereby increasing the problem of spreading of disease. The advantage of gels based on swollen granules is that if they inadvertently become distributed over plant parts, only a smaller cart will become infected compared with a gel based on a dissolved polymer. From practice and from literature the use of gels based on granules with a size of 0.5 mm is already known. The interstitial spaces between the swollen granules contain liquid water. This water is still able to spread diseases, albeit to a limit degree. For this reason is a known practice in the prior art to dissolve a polymer in said interstitial water and to mare the water into gel. Such a gel is relatively complex (different gel forming components) and has been shown in practice to be difficult to handle, for example, when transferring the gel into a holder. If a gel is used that has been prepared by adding to the granules only so much water as the granules are able to absorb, a cut flower that has been inserted into the gel will be unable to take up sufficient water.

It is the aim of the present invention to eliminate the above-mentioned disadvantages to a large extent.

To this end the method according to the present invention is characterized in that the stems are inserted into a gel on polyacrylamide basis, in which the size of the dry granules is 0.2 mm or smaller.

Surprisingly it has been shown that a gel based on a polyacrylamide-comprising polymer, in which the granules in dry condition have a size of 0.2 mm or smaller, is not only easier to handle (i.e. easier to pump), but also that there is no longer any need for a polymer in solution. Moreover, it appears that sufficient water is released for the preservation of the cut flowers. Without wishing to be bound to any theory, it is believed that due to their larger surface area smaller granules are better able to release water to be taken up by the cut flowers. The gel used in the method is liquid, that is to say it is able to flow. The lower-limit size of the granules does not appear to be typical, but preferably it will in general be larger than the diameter of the capillaries of the respective cut flower. Although a soluble polymer may be used, it is not required and by refraining from doing so, a simple gel-forming composition may be provided.

A gel suitable for application in the method according to the present invention contains sufficient gel-forming polymer to increase the viscosity of the aqueous medium such that it will not easily splash or run out of the holder. The upper limit of the concentration of gel-forming polymer in a gel according to the invention is determined by the ability of the gel to release water to the cut flower. With the method according to the present invention there is no objection to the gel exhibiting some syneresis, that is to say that it temporally loses water.

Depending on the desired flow behaviour and the storage life of the cut flowers, a person knowledgeable about gels is able in a simple manner to determine a suitable concentration of gel-forming polymer. If a higher concentration unacceptably shortens the storage life, the concentration of gel-forming polymer has to be reduced. If the aqueous medium is too thin, the concentration of gel-forming polymer has to be increased. Reference in the present application to a granule size of less than 0.2 mm is understood to mean a size distribution of granules, in which more than 80% by weight, and preferably at least 90% by weight of the granules have a size of 0.2 mm or smaller.

A typical suitable concentration of gel-forming polymer is 3 to 25 g per liter, and is preferably 5 to 20 g per liter of the final gel.

According to a preferred embodiment, the gel comprises 6 to 14 g gel-forming polymer per litre of the final gel.

According to a favourable embodiment the aqueous gel further comprises at least one compound chosen from the group comprised of a disinfectant, a surfactant, nutrients and a colouring agent.

The first three promote the storage life of the cut flowers. A colouring agent may, for example, be used for the identification of a gel with a particular composition, for example, to indicate for which kind of cut flowers the gel is suitable.

According to a very favourable embodiment the aqueous gel comprises polyacrylamide and has a pH between 2.5 and 7, preferably between 4 and 6.5.

Such gels have been proven to be very effective for the preservation of cut flowers.

The method according to the present invention is in particular also suitable for the reservation of cut flowers during transport. The cut flowers are preferably transported in a substantially horizontal position.

As a result it has become possible to also transport cut flowers that are sensitive to dryness using up a smaller volume. This means that air transport is more often economically feasible, thereby allowing the supply to markets that could previously not be catered for because of the short life that would remain for the flowers once they have reached the consumer. For nearer markets applies that the consumer is able to enjoy the flowers longer. The term "substantially horizontally" is understood to mean an angle smaller than approximately 25°.

The present invention also relates to a gel on water basis provided with nutrients for cut flowers, which gel has been prepared by allowing granules of a water-absorbent cross-linked polymer on polyacrylamide basis to swell, which granules in dry state have a size 0.2 mm or smaller.

Finally, the present invention relates to a holder for the preservation of cut flowers, which holder comprises a bottom and an opening for the insertion of the stem of the cut flower and is provided with a gel according to the invention, which holder is further provided with means for keeping the end of a stem of the cut flower at a distance from the bottom.

Especially when the stem of the cut flower has been cut straight across, there is a risk when using the gel according to the present invention that due to contact with the holder the cut-off end does not make sufficient contact with the gel granules, so that the cut flower does not receive an adequate amount of water. This is particularly a problem with the gel according to the present invention because of the smaller diameter of the water-conducting channels between the swollen gel granules (capillary forces). The provision of means for distancing ensures that sufficient gel granules make contact wit the cut end of the flower.

According to a preferred embodiment the holder is provided with sealing means chosen from the group comprising i) a cap sealing the opening by means of clamps; ii) pierceable membrane; and iii) a removable membrane provided with means for removing the membrane by pulling it off.

Such a holder can be prefabricated and can simply be prepared for use for the preservation of a cut flower by a flower grower, florist or consumer.

Figure 2:
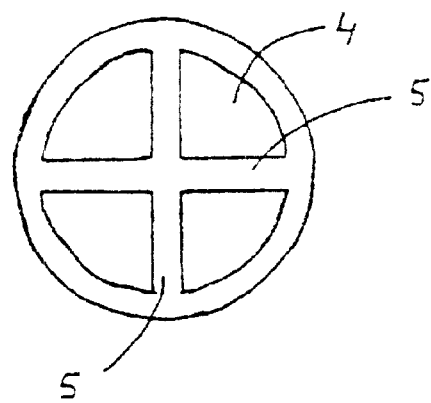

The invention will be explained with reference to the following exemplary embodiments and with reference to the drawings in which FIG. 1 represents a longitudinal section of a holder according to the invention; and FIG. 2 represents a cross-section of the holder of FIG. 1 along line II—II.

1) Preparation of a Gel for the Preservation of Cut Flowers.

76 g polyacrylamide having a granule size <0.2 mm, Stockosorb 400 F (Chemische Fabrik Stockhausen GmbH, Krefeld, Germany) which is 0.1% cross-linked, is added to 10 l of a solution comprised of 5 g/l Flower food (Laboratorium van der Sprong B.V., Roelofarendsveen, The Netherlands) for lathyrus, or 10 g/l for carnations. Among other things, Flower food comprises a disinfectant, a surfactant, and nutrients. For the person skilled in the art it will be obvious that depending on the crop to be preserved, other compositions that are known as such, may be used. The mixture is blended until a homogenous gel is obtained. The pH of the gel is approximately 5.

2) The Gel's Suitability for Lathyrus.

The suitability of the gel was tested by placing lathyrus cut flowers in the gel as prepared above. As control, an aqueous medium was used having the same composition but without the gel-forming agent.

The presence of the gel-forming agent appeared to have no adverse effect on the storage life.

3) The Gel's Suitability for Carnations.

The suitability of the gel according to the invention was tested by placing carnations into the gel prepared as in 1). As control, an aqueous medium was used having the same composition but without the gel-forming agent. Without the gel-forming agent the storage life was 12.8 days and with the gel-forming agent 12.4 days.

4) The Effect of Gel Granule Size.

In the manner described for 1) for lathyrus, gels were made on the basis of

| Stockosorb 400 F | (0–200 micron) |
| Stockosorb 400 K | (200–800 micron) |
| Stockosorb 400 RD | (100–800 micron) |
| Stockosorb 410 K | (800–3000 micron). |

As control flowers from the same batch were used without being placed into a gel. All flowers were stored in a horizontal position for 48 hours at 16° C. After completion of this simulation of transport all the flowers, those in gel as well as those of the control group, were wilted and discoloured. However, this did not apply to the flowers that were stored in the gel comprising Stockosorb 400F. These were still completely turgid and had their original colour. Subsequently, the storage life of all the bunches of flowers was examined by placing the individual bunches into a vase with clean water. The storage life of the control group was shown to be the same as that of the flowers tested on gels with larger granules. The flowers that were stored on Stockosorb 400F had a longer storage life. As additional controls use is made or gels based on Terawet™ (polyacrylate/polyacrylamide copolymers; granule size between 70 and 2000 micron; Terawet Corp., San Diego, USA) and Broadleaf™ P4 (polyacrylamide gel; precise granule size unknown but relatively large. Greenacres, Denham, UK). These also did not show the favourable results that were seen when using a gel according to the invention.

As holder, a deformable holder may be used, whose end opposite the bottom is pressed against the stems with the aid of fastening means. In this manner the gel is contained by the holder, while due to the high viscosity the gel is not, or only with difficulty able to pass through the narrow gaps between the stems. This is an effective way of achieving that the bottom ends of the stems remain in contact with an aqueous medium while the likelihood of spreading diseases is greatly reduced. Suitable fastening means are, for example, string, a rectangular scrip of plastic reinforced with wire, and according to a favourable embodiment, an elastic band or tape. The holder is made of a gel- or water-impermeable material, for example a plastic such as polyethylene. The deformable holder is, for example, a plastic bag.

The holder may also be a rigid holder, such as a holder for one cut flower. These are known to the public to be used mostly for orchids, but may also be used for other cut flowers such as roses and gerberas. In order to ensure supply of water to the cut flower when the gel according to the present invention is used, and in particular in the case of the stem being cut straight-across, the holder has to be provided with means for keeping the end of the stem off the wall and in particular off the bottom of the holder. There are various ways of achieving this. One could consider elements projecting from the wall of the holder, bending the stem in an undulatory manner. This causes the holder to be held to the stem by means of friction. The holder may also be provided with projections on which the end of the stem rests, which projections will to a large extent leave the end of the stem free.

A suitable embodiment is represented in FIG. 1, showing a longitudinal section of a holder 1, with a cavity 2 for the accommodation of gel. The bottom 3 is provided with protuberances 4 leaving open a channel 5. The width of the channel 5 is greater than the size of the swollen gel granules and smaller than the diameter of the stem of the cut flower for which the holder has been designed. In this way a sufficient supply of water to the cut flower is ensured. If the stem happens to come between the wall of the holder 1 and a projection 4 the supply of water is also ensured.

FIG. 2 shows a cross-section of the holder 1 wherein the embodiment represented is provided with two channels 5 and four protuberances 4.

For use the holder is conveniently provided with a seal, such as a cap. The cap may be a cap that clamps around the open end of the holder 1, or a cap that clamps against the inside of the opening. In the latter case the cap is conveniently provided with a lip part to facilitate removal of the cap. The holder may also be sealed by means of a membrane, such as plastic foil that is glued to the end. The membrane may be provided with non-perforated grooves, which make it easier to prick a stem through the locally weakened membrane. Alternatively, the membrane may also be removed before use, in which case the membrane is suitably provided with a lip part.

What is claimed is:

1. A method of preserving cut flowers, comprising the steps of:
    preparing an aqueous gel by adding granules of a water absorbent cross-linked polyacrylamide polymer having a particle size when dry of a 0.2 mm or less to an aqueous solution;
    allowing the granules to swell in the aqueous solution to form a gel, placing the gel into a holder provided with a bottom; and
    inserting cut flower stems into the gel;
    whereby the cut flower stems may be transported and preserved in the holder.

2. A method according to claim 1, wherein the gel comprises 5 to 20 gel-forming polymer per liter of the final gel.

3. A method according to claim 2, wherein the gel comprises 6 to 14 gel-forming polymer per liter of the final gel.

4. A method according to claim 1, wherein the aqueous solution comprises at least one compound chosen from the group consisting of a disinfectant, and surfactant, nutrients and a coloring agent.

5. A method according to claim 1, wherein the aqueous gel has a pH between 4 and 6.5.

6. A method of preserving cut flowers according to claim 1, wherien the cut flowers are transported at a substantially horizontal angle of less than approximately 25°.

7. A method according to claim 1, wherein the holder is provided with means for keeping the end of the stem of a cut flower at a distance from the bottom.

8. An aqueous gel provided with nutrients for cut flowers, comprising:
    the gel, wherein the gel is prepared by allowing granules of water-absorbent cross-linked polymer to swell;
    wherein the size of the granules when dry is 0.2 mm or less; and
    the water-absorbent cross-linked polymer is polyacrylarnide.

* * * * *

UNITED STATES PATENT AND TRADEMARK OFFICE
CERTIFICATE OF CORRECTION

PATENT NO.    : 6,688,039 B2
DATED         : February 10, 2004
INVENTOR(S)   : Hans Vonk et al.

It is certified that error appears in the above-identified patent and that said Letters Patent is hereby corrected as shown below:

Column 1,
Line 31, replace "cart" with -- part --.
Line 36, replace "limit" with -- limited --.

Column 2,
Line 11, replace "behaviour" with -- behavior --.
Line 27, replace "litre" with -- liter --.
Lines 31 and 33, replace "colouring" with -- coloring --.
Line 36, replace "favourable" with -- favorable --.

Column 3,
Line 13, insert -- a -- before "pierceable".

Column 4,
Lines 1-2, replace "discoloured" with -- discolored --.
Line 4, replace "colour" with -- color --.
Lines 16 and 28, replace "favourable" with -- favorable --.

Column 5,
Line 21, replace "20" with -- 20g --.
Line 24, replace "14" with -- 14g --.

Signed and Sealed this

Twenty-seventh Day of September, 2005

JON W. DUDAS
*Director of the United States Patent and Trademark Office*